(12) United States Patent
Kato et al.

(10) Patent No.: US 7,551,600 B2
(45) Date of Patent: Jun. 23, 2009

(54) TELEPHONE TERMINAL, CALL SYSTEM, INTERNET TERMINAL AND TERMINAL CONTROL PROGRAM

(75) Inventors: Tokunori Kato, Ichinomiya (JP); Shozo Kabeya, Gamagori (JP); Kazuhiro Kuwabara, Handa (JP); Katsunori Enomoto, Toyokawa (JP); Tetsuya Ouchi, Nagoya (JP); Susumu Chida, Ichinomiya (JP); Hideaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 795 days.

(21) Appl. No.: 10/633,620

(22) Filed: Aug. 5, 2003

(65) Prior Publication Data
US 2004/0028198 A1 Feb. 12, 2004

(30) Foreign Application Priority Data
Aug. 7, 2002 (JP) .............................. 2002-229956

(51) Int. Cl.
H04L 12/66 (2006.01)
(52) U.S. Cl. .................. 370/352; 379/90.01; 379/93.01; 379/93.09; 379/210.01; 379/230
(58) Field of Classification Search .............. 379/90.01, 379/93.01, 93.09, 210.01, 230; 370/352
See application file for complete search history.

(56) References Cited

U.S. PATENT DOCUMENTS

| | | | | |
|---|---|---|---|---|
| 5,805,587 | A | * | 9/1998 | Norris et al. ................. 370/352 |
| 5,953,322 | A | * | 9/1999 | Kimball ...................... 370/328 |
| 5,953,407 | A | * | 9/1999 | Zhang et al. ........... 379/373.02 |
| 6,353,611 | B1 | * | 3/2002 | Norris et al. ................. 370/356 |
| 6,542,472 | B1 | | 4/2003 | Onuma |
| 6,842,448 | B1 | * | 1/2005 | Norris et al. ................. 370/352 |
| 6,961,333 | B2 | * | 11/2005 | Norris et al. ................. 370/352 |

FOREIGN PATENT DOCUMENTS

| | | |
|---|---|---|
| JP | A 10-93732 | 4/1998 |
| JP | A 10-233855 | 9/1998 |
| JP | A 11-220549 | 8/1999 |
| JP | A 2000-224333 | 8/2000 |
| JP | A 2001-217929 | 8/2001 |

* cited by examiner

*Primary Examiner*—Quynh H Nguyen
(74) *Attorney, Agent, or Firm*—Oliff & Berridge, PLC

(57) ABSTRACT

A call system for performing a voice call by an Internet call function using a known telephone terminal. In a multifunction machine serving as the telephone terminal, the output destination and the input source of audio signals input/output from/to a transmitter/receiver may be switched to an audio I/F. In the switched state, audio based on audio signals input/output from/to an outside source through the audio I/F is output/input from the transmitter/receiver. Therefore, when the multifunction machine is connected to a PC having the Internet call function such that audio signals can be input/output through an audio cable, an indirect audio call by the Internet call function with the transmitter/receiver is available. When an incoming call from a telephone line network is received, reception of the incoming call is notified so that a user can confirm the reception of the incoming call during the voice call by the Internet call function.

7 Claims, 4 Drawing Sheets

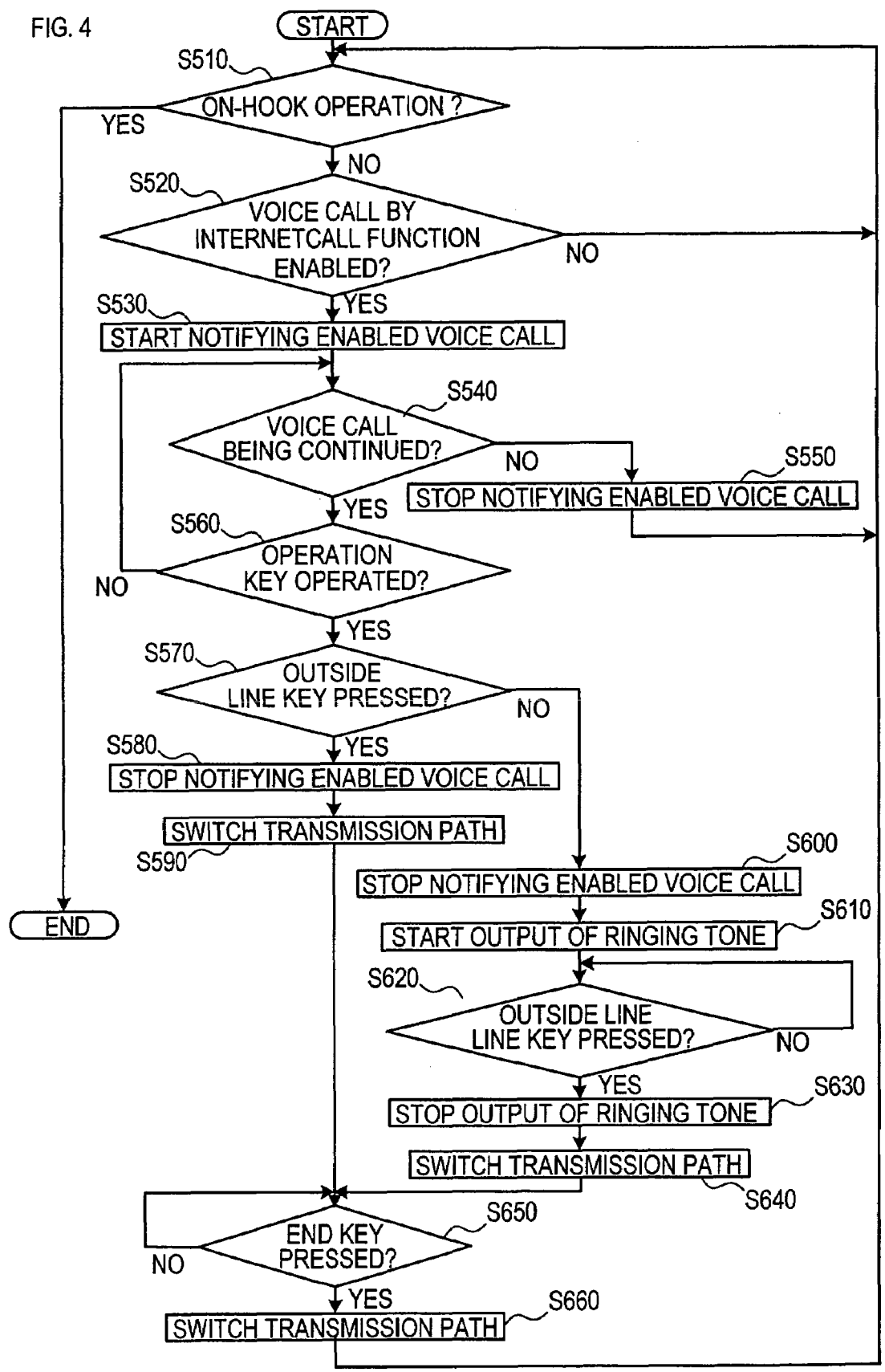

TELEPHONE TERMINAL, CALL SYSTEM, INTERNET TERMINAL AND TERMINAL CONTROL PROGRAM

BACKGROUND OF THE INVENTION (1) Field of the Invention

The present invention relates to a telephone terminal that performs a voice call by inputting/outputting audio based on audio signals transmitted through a telephone line network and through an Internet network from a transmitter/receiver.

(2) Background Art

These days Internet terminals allowing data communication through the Internet network are becoming widespread. Such Internet terminals include one having a function to perform a voice call (hereinafter referred to as the "Internet call function") by inputting/outputting audio signals from/to the Internet network and inputting/outputting audio based on the audio signals from/to a transmitter/receiver device connected to the Internet terminal (e.g. a headset: a device with a microphone integrated into a headphone or an earphone).

In such an Internet terminal, audio based on the audio signals input/output from/to the Internet network may be output/input from a speaker and a microphone other than a headset. However, depending on the location of the speaker and the microphone, the audio output from the speaker may be difficult to be heard or the volume of the audio input from the microphone may be low, so that a voice call in good condition cannot be obtained in some cases. Therefore, it is usual to use the transmitter/receiver device (headset) connected to the Internet terminal to perform a voice call by the Internet call function.

However, the transmitter/receiver device, which is a dedicated device to be used for performing a voice call by the Internet call function, cannot be used for other purposes.

It is preferable that a device to be used for other purposes can also be used as a device to be used for the Internet call function, for any dedicated device for performing a voice call by the Internet call function is then no longer necessary to be provided.

An example of the device to be used for the Internet call function is a known telephone terminal that performs a voice call by inputting/outputting audio based on audio signals transmitted through the telephone line network from a transmitter/receiver. Such a telephone terminal can be used as an ordinary telephone terminal when the Internet call function is not used.

It has not been realized, however, to perform a voice call by the Internet call function using a known telephone terminal, and technology to allow such a voice call has been required.

An object of the present invention is to provide a telephone terminal and a call system to allow a voice call to be performed by the Internet call function using a known telephone terminal as well as a terminal control program to be used in the telephone terminal and the call system.

SUMMARY OF THE INVENTION

The above and other objects are attained by a telephone terminal for enabling a voice call by inputting/outputting audio based on audio signals transmitted through a telephone line network from a transmitter/receiver, the telephone terminal comprising: an NCU capable of inputting/outputting audio signals through the telephone line network, an audio input/output path provided besides the NCU and capable of inputting/outputting audio signals from/to an outside source through an Internet network; a switch device for switching an output destination of audio signals based on audio input from the transmitter/receiver and an input source of audio signals to be output as audio from the transmitter/receiver from the NCU to the audio input/output path according to a user's operation; and a telephone call notification device for notifying reception of an incoming call from the telephone line network when the incoming call from the telephone line network is received in the state in which the output destination and the input source of audio signals have been switched to the audio input/output path by the switch device.

According to the telephone terminal configured as above, it is possible to switch the output destination of audio signals based on the audio input from the transmitter/receiver and the input source of audio signals to be output as audio from the transmitter/receiver to the audio input/output path capable of inputting audio signals from the outside source and of outputting audio signals to the outside source through the Internet network.

In the state in which the input source and the output destination of audio signals have been switched to the audio input/output path, audio based on the audio signals input from the outside source through the audio input/output path is output from the transmitter/receiver, and audio signals based on the audio input from the transmitter/receiver is output to the outside source through the audio input/output path.

Accordingly, by connecting the telephone terminal to an Internet terminal having a function to accomplish a voice call based on audio signals input/output from the Internet network (hereinafter referred to as the "Internet call function") such that input/output of audio signals is allowed through the audio input/output path, an audio call can be made by the Internet call function with the transmitter/receiver of the telephone terminal. In this case, the audio call is performed not directly from the telephone terminal but indirectly through the Internet terminal.

Also, if an incoming call from the telephone line network is received in the state in which the input source and the output destination of audio signals have been switched to the audio input/output path, notification of reception of the incoming call from the telephone line network is made by the first notification device. "The state in which the input source and the output destination of audio signals have been switched to the audio input/output path" here means that an indirect audio call by the Internet call function is available with the transmitter/receiver. Therefore, when a user receives an incoming call from the telephone line network while a voice call by the Internet call function is in progress, the user can confirm reception of the incoming call from the telephone line network by the notification by the telephone call notification device.

The user who has confirmed reception of the incoming call may respond to the incoming call from the telephone line network by making the input source and the output destination of audio signals switched to the telephone line network by the switch device. Furthermore, the user may return to the voice call by the Internet call function on hold by making the input source and the output destination of audio signals switched back to the audio input/output path, i.e. to the Internet network.

As described above, the present telephone terminal accomplishes the same function as an interrupt call service (so-called Catch Phone™ service) offered by the telephone central office in connection with ordinary audio calls through the telephone line network by the function provided for the telephone terminal itself.

The interrupt call service here means a service that when a second incoming call is made to a telephone terminal during an existing audio call, the telephone central office outputs an audio signal to notify of the second incoming call to the telephone terminal, and also allows the connection to the telephone terminal to be switched from the other end of the existing audio call to the other end of the second incoming call, or from the other end of the second incoming call to the other end of the existing audio call.

The telephone call notification device may notify reception of an incoming call by displaying a message indicating reception of the incoming call on a display unit, or by actuating a mechanism that performs a specific action, such as a vibrator including a motor.

The telephone call notification device also may make audio indicating reception of an incoming call from the telephone line network output from the transmitter/receiver to notify reception of the incoming call.

According to the telephone terminal configured as above, since the telephone call notification device makes audio indicating reception of an incoming call output from the transmitter/receiver, a user who is making an indirect audio call by the Internet call function through the transmitter/receiver easily finds the notification by the telephone call notification device and is prevented from failing to respond to the incoming call from the telephone line network.

The "user's operation" that causes the output destination and the input source of audio signals to be switched to the audio input/output path by the above described switch device, which is not limited to a specific operation, may be performed, for example, by providing a dedicated operation unit (e.g. a switch) for the switching to the audio input/output path, i.e. to the Internet network, and operating the operation unit. Alternatively, the "user's operation" may be performed by setting a specific operation procedure for the switching to the audio input/output path and operating according to the operation procedure. The operation procedure may be, for example, to long press (for a certain time period) a specific operation button, or to operate a plurality of buttons in a specific order.

In another aspect of the present invention, there is provided a call system which comprises: an Internet terminal with an Internet call function allowing input/output of audio signals transmitted through the Internet network; and a terminal device connected to the Internet terminal through an audio transmission path for transmitting audio signals, wherein the Internet terminal makes the terminal device output audio based on audio signals to thereby enable a voice call, and wherein the terminal device is the telephone terminal as described above.

According to the call system configured as above, wherein the Internet terminal and the telephone terminal are connected so as to allow input/output of audio signals, an indirect audio call by the Internet call function may be made through the transmitter/receiver of the telephone terminal. Further, the present call system accomplishes the same function as an interrupt call service offered by the telephone central office in connection with ordinary audio calls through the telephone line network by the function provided for the telephone terminal itself.

Especially when the telephone terminal in which audio indicating reception of an incoming call from the telephone line network is output from the transmitter/receiver is used as the terminal device to be connected to the Internet terminal, a user who is making an indirect audio call by the Internet call function through the transmitter/receiver easily finds the notification by the telephone call notification device and is prevented from failing to respond to the incoming call from the telephone line network.

In a further aspect of the present invention, there is provided a call system which comprises: an Internet terminal with an Internet call function allowing input/output of audio signals transmitted through the Internet network; and a telephone terminal enabling a voice call by inputting/outputting audio based on audio signals transmitted through a telephone line network from a transmitter/receiver, the telephone terminal being connected to the Internet terminal through an audio transmission path for transmitting audio signals and a control transmission path for transmitting control signals wherein the Internet terminal includes: an Internet terminal side audio input/output path for inputting/outputting audio signals from/to the telephone terminal through the audio transmission path, an Internet terminal side control output path for outputting control signals to the telephone terminal through the control transmission path, and a notification signal output device for outputting a notification signal as a control signal for notifying an enabled voice call by the Internet call function to the telephone terminal through the Internet terminal side control output path and the control transmission path when the voice call is enabled, and wherein the telephone terminal includes: a telephone terminal side audio input/output path for inputting/outputting audio signals from/to the Internet terminal through the audio transmission path, a telephone terminal side control input path for inputting control signals from the Internet terminal through the control transmission path, a switch device for switching an output destination of audio signals based on audio input from the transmitter/receiver and an input source of audio signals to be output as audio from the transmitter/receiver between either the NCU of telephone terminal or the telephone terminal side audio input/output path according to a user's operation, and an Internet call notification device for notifying an enabled voice call by the Internet call function when the notification signal is input from the Internet terminal through the control transmission path and the telephone terminal side control input path in the state in which the output destination and the input source of audio signals have been switched to the NCU of the telephone terminal by the switch device.

According to the call system configured as above, it is possible to switch the output destination of audio signals based on the audio input from the transmitter/receiver and the input source of audio signals to be output as audio from the transmitter/receiver to the telephone terminal side audio input/output path by the switch device of the telephone terminal.

In the state in which the input source and the output destination of audio signals have been switched to the telephone terminal side audio input/output path, the telephone terminal outputs audio based on the audio signals input from the Internet terminal through the audio transmission path and the telephone terminal side audio input/output path is output from the transmitter/receiver, and audio signals based on the audio input from the transmitter/receiver is output to the Internet terminal through the telephone terminal side audio input/output path and the audio transmission path. Thus, an indirect audio call by the Internet call function may be made through the transmitter/receiver of the telephone terminal.

When the voice call by the Internet call function is enabled, the Internet terminal provides a notification signal as a control signal for notifying the enabled voice call to the telephone terminal by the notification signal output device through Internet terminal side control output path and the control transmission path. The telephone terminal which receives the notification signal through the control transmission path and the telephone terminal side control input path notifies the enabled voice call by the Internet call function by the Internet call notification device, if the output destination and the input source of audio signals have been switched to the telephone line network.

"The state in which the output destination and the input source of audio signals have been switched to the telephone line network" here means that an ordinary audio call through the telephone line network in progress. Therefore, when the voice call by the Internet call function is enabled while an ordinary audio call is in progress, the user can confirm the enabled voice call by the Internet call function by the notification by the Internet call notification device.

The user who has confirmed the enabled voice call by the Internet call function may respond to the voice call by the Internet call function by making the output destination and the input source of audio signals switched to the telephone terminal side audio input/output path, i.e. to the Internet network. Furthermore, the user may return to the ordinary audio call through the telephone line network on hold by making the output destination and the input source of audio signals switched back to the telephone line network.

Thus, the present call system accomplishes the same function as an interrupt call service offered by the telephone central office in connection with ordinary audio calls through the telephone line network by the functions provided for the Internet terminal and the telephone terminal.

The Internet call notification device may notify an enabled voice call by displaying a message indicating the enabled voice call on a display unit, or by actuating a mechanism that performs a specific action, such as a vibrator including a motor.

The Internet call notification device also may make audio indicating the enabled voice call by the Internet call function output from the transmitter/receiver to notify the enabled voice call.

According to the telephone terminal configured as above, since the Internet call notification device makes audio indicating an enabled voice call by the Internet call function output from the transmitter/receiver, the user who is making an ordinary audio call through the telephone line network easily finds the notification by the Internet call notification device and is prevented from failing to respond to the voice call by the Internet call function.

The "user's operation" that causes the output destination and the input source of audio signals to be switched to the audio input/output path by the switch device provided for the telephone terminal may be performed, for example, by providing a dedicated operation unit (e.g. a switch) for the switching to the audio input/output path and operating the operation unit. Alternatively, the "user's operation" may be performed by setting a specific operation procedure for the switching to the audio input/output path and operating according to the operation procedure.

In the call system of the present invention, the telephone terminal may comprise a telephone call notification device for notifying reception of an incoming call from the telephone line network when the incoming call from the telephone line network is received in the state in which the output destination and the input source of audio signals have been switched to the telephone terminal side audio input/output path, i.e. to the Internet network, by the switch device.

Thus, when a user receives an incoming call from the telephone line network while a voice call by the Internet call function is in progress, the user can confirm reception of the incoming call from the telephone line network by the notification by the telephone call notification device.

In yet another aspect of the present invention, there is provided an Internet terminal with an Internet call function allowing input/output of audio signals transmitted through the Internet network. The Internet terminal comprises an audio input/output path for inputting/outputting audio signals from/to an outside source through an audio transmission path for transmitting audio signals; a control output path for outputting control signals to an outside source through a control transmission path for transmitting control signals; and a notification signal output device for outputting a notification signal as a control signal for notifying an enabled voice call by the Internet call function to the control transmission path through the control output path when the voice call is enabled.

A call system which comprises the Internet terminal configured as above may achieve the same operation and advantages as the aforesaid call system.

In a further aspect of the present invention, there is provided a terminal control program to make a computer system execute a variety of processes for controlling a telephone terminal that performs a voice call by inputting/outputting audio based on audio signal transmitted through a telephone line network. The terminal control program includes a switching process to switch an output destination of audio signals based on audio input from a transmitter/receiver and an input source of audio signals to be output as audio from the transmitter/receiver to an audio input/output path for inputting/outputting audio signals from/to an outside source through the Internet; and a telephone call notification process to notify reception of an incoming call from the telephone line network when the incoming call from the telephone line network is received in the state in which the output destination and the input source of audio signals have been switched to the audio input/output path to be connected to the Internet in the switching process.

A telephone terminal which comprises partially the computer system for controlling the telephone terminal according to the above program may achieve the same operation and advantages as the aforesaid telephone terminal.

The terminal control program may be a program that makes audio indicating reception of an incoming call from the telephone line network output from the transmitter/receiver in the telephone call notification procedure.

In a yet another aspect of the present invention, there is provided a terminal control program to make a computer system execute a variety of processes for controlling a telephone terminal that performs a voice call by inputting/outputting audio based on audio signal transmitted through a telephone line network, the terminal control program including a switching process to switch an output destination of audio signals based on audio input from a transmitter/receiver and an input source of audio signals to be output as audio from the transmitter/receiver between the telephone line network and an audio input/output path for inputting/outputting audio signals from/to an outside source through the Internet; and an Internet call notification process to notify the nature of a control signal when the control signal is input from the outside source through a control input path for inputting a control signal in the state in which the output destination and the input source of audio signals have been switched to the telephone line network in the switching process.

A call system which comprises partially a computer system for controlling the telephone terminal according to the above program may achieve the same operation and advantages as the aforesaid call system.

The terminal control program may be a program that makes audio indicating an enabled voice call by the Internet call function output from the transmitter/receiver in the Internet call notification procedure.

In a further aspect of the present invention, there is provided a terminal control program to make a computer system execute a variety of processes for controlling an Internet terminal with an Internet call function allowing input/output of audio signals transmitted through the Internet network, the terminal control program including a notification signal output process to output a notification signal as a control signal for notifying an enabled voice call by the Internet call function through a control transmission path for transmitting control signals when the voice call is enabled.

A call system which comprises partially a computer system for controlling the Internet terminal according to the above program may achieve the same operation and advantages as the aforesaid call system.

The terminal control program mentioned above are provided to the Internet terminal itself, the computer system or the user of the Internet terminal and the computer through a recording medium, such as an FD and a CD-ROM, or a communication network, such as the Internet.

The computer system to execute the terminal control program may be, for example, a computer system embedded in the Internet terminal or a computer system connected to the Internet terminal through a wireless or cable communication path so as to allow data communication therebetween.

BRIEF DESCRIPTION OF THE DRAWINGS

The present invention will now be described, by way of example, with reference to the accompanying drawings, in which:

FIG. 4 is a flowchart showing the procedure of an ordinary call process.

DETAILED DESCRIPTION OF THE PREFERRED EMBODIMENT

Figure 1:
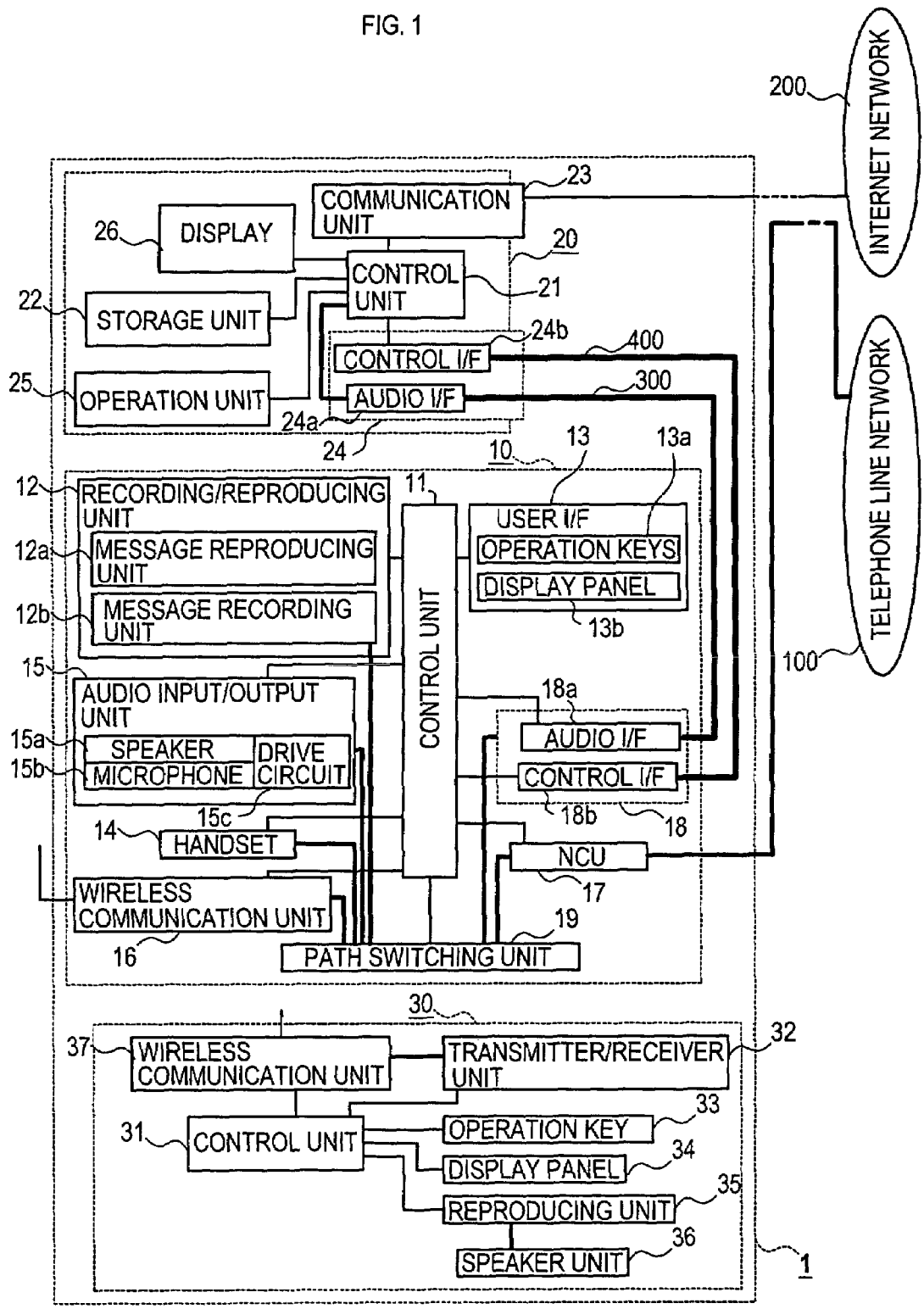
FIG. 1 is a block diagram showing the control system of a call system according to a preferred embodiment.

As shown in FIG. 1, a call system 1 comprises a multifunction machine 10 having a function to perform a voice call based on audio signals transmitted through a telephone line network 100 and a personal computer (hereinafter referred to as the "PC") 20 capable of performing data communication through an Internet network 200. The multifunction machine 10 and the PC 20 are interconnected through an audio cable 300 capable of transmitting audio signals and a USB (Universal Serial Bus) cable 400 capable of transmitting control signals, respectively.

The multifunction machine 10 comprises a control unit 11 for controlling the operation of the entire multifunction machine 10, a recording/reproducing unit 12 for recording audio signals and reproducing audio based on audio signals, a user interface (hereinafter referred to as the "user I/F") 13, a handset 14 that is a transmitter/receiver to be used in the state in which it is detached (i.e. off-hooked) from the multifunction machine 10, an audio input/output unit 15 for inputting/outputting audio, a wireless communication unit 16 for performing wireless communication, an NCU (Network Control Unit) 17 for inputting/outputting audio signals transmitted through the telephone line network 100, an external interface 18 including an audio signal interface (hereinafter referred to as the "audio I/F") 18*a* for inputting/outputting audio signals transmitted through the audio cable 300 and a control signal interface (hereinafter referred to as the "control I/F") 18*b* for inputting/outputting control signals transmitted through the USB cable 400, a path switching unit 19 for switching the transmission path of audio signals within the multifunction machine 10 and a handset terminal 30 for wireless calls that performs wireless communication with the main unit of the multifunction machine 10 (i.e. wireless communication unit 16).

Among these, the recording/reproducing unit 12 includes a message reproducing unit 12*a* for reproducing audio based on various audio signals that have been previously recorded and a message recording unit 12*b* for recording a message left on a voice mail recording as audio signals. In the message reproducing unit 12*a*, audio signals such as a ringing tone to be used when an incoming call is received, a hold tone to be used when a voice call is placed on hold, a voice mail prompt message indicating that recording of a message will be started on voice mail recording, and an interrupt tone to be used in the after mentioned Internet call process (see FIG. 3) and ordinary call process (see FIG. 4) are recorded. The interrupt tone here means a special tone, such as a call waiting tone, which notifies during a voice call that there is another incoming call.

The user I/F 13 comprises operation keys 13*a* including a plurality of keys and a display panel 13*b* for displaying a variety of information. The operation keys 13*a* specifically include a plurality of number keys, a hold key for starting/terminating the hold state of a voice call, a switch key for switching the transmission path to be used for input/output of audio signals from/to the outside source from the NCU 17 to the audio I/F 18*a*, an outside line key for starting a voice call and an end key for terminating a voice call.

The audio input/output unit 15 includes a speaker 11*a*, a microphone 15*b* and a drive circuit 15*c* for driving the speaker 15*a* and the microphone 15*b*. The audio input/output unit 15 may be used for performing a voice call (hands-free call) by using the speaker 15*a* and the microphone 15*b* as a transmitter/receiver as well as for outputting audio based on various audio signals from the speaker 15*a*.

The wireless communication unit 16 performs a wireless call by transmitting/receiving various signals including audio signals to/from the handset terminal 30 via wireless communication.

The path switching unit 19 switches the transmission path to be used for input/output of audio signals from/to the outside of the multifunction machine 10 between either the NCU 17 or the audio I/F 18*a*, in accordance with a command from the control unit 11. The transmission path is set to the NCU 17 in the initial state.

When an operation to start a call (hereinafter referred to as an "off-hook operation") is performed by a component that functions as a transmitter/receiver (the handset 14, the audio input/output unit 15 or the handset terminal 30 (the wireless communication unit 16 hereinafter referred to as the "transmitter/receiver or the like"), the path switching unit 19 sets the transmission destination of audio signals input from the outside source and the transmission source of audio signals to be output to the outside source to the transmitter/receiver or the like.

Specifically, the transmission destination and the transmission source are set to the handset 14 when the handset 14 is off-hooked, to the audio input/output unit 15 when the outside line key is pressed with the operation keys 18*a* of the user I/F 13, and to the wireless communication unit 16 when an operation to start a call is performed by the handset terminal 30 (by an outside line key constituting the after-mentioned operation keys 33).

On the other hand, when an operation to terminate a call (hereinafter referred to as an "on-hook operation") is performed by the transmitter/receiver or the like, the path switching unit 19 clears the current setting of the transmission destination and the transmission source of audio signals to the transmitter/receiver or the like.

Specifically, the transmission destination and the transmission source of audio signals are cleared when the handset 14 is on-hooked, when the end key is pressed with the operation keys 13a of the user I/F 13, and when an operation to terminate a call is performed by the handset terminal 30 (by the end key constituting the after-mentioned operation keys 33).

Also, if an off hook operation has not been performed within a predetermined time period since the reception of an incoming call from the telephone line network 100, the path switching unit 19 sets the transmission destination and the transmission source of audio signals to the recording/reproducing unit 12, in accordance with a command from the control unit 11.

Once the transmission destination and the transmission source are set to the recording/reproducing unit 12, the recording/reproducing unit 12 reproduces the voice mail prompt message recorded in the message reproducing unit 12a in accordance with a command from the control unit 11, and thereby the audio signal of the voice mail prompt message is output to the source of the incoming call through the telephone line network 100. After the output of the audio signal of the voice mail prompt message, audio signals input from the source of the incoming call through the telephone line network 100 are recorded by the message recording unit 12b.

The handset terminal 30 comprises a control unit 31 for controlling the operation of the entire handset terminal 30, a transmitter/receiver unit 32 including a first speaker, a microphone and a drive circuit for driving the speaker and the microphone, operation keys 33 including a plurality of keys, a display panel 34 for displaying a variety of information, a reproducing unit 35 for reproducing audio based on various audio signals that have been previously recorded, a speaker unit 36 including a speaker and a drive circuit for driving the speaker that outputs audio reproduced by the reproducing unit 35 and a wireless communication unit 37 for transmitting/receiving various signals including audio signals via wireless communication to/from the main unit of the multifunction machine 10 (i.e. wireless communication unit 16).

The operation keys 33 provided in the handset terminal 30 specifically include a plurality of number keys, an outside line key for starting a voice call, an end key for terminating a voice call and a hold key for starting/terminating the hold state of a voice call.

In the reproducing unit 35, audio signals such as a ringing tone to be used when an incoming call is received, a hold tone to be used when a voice call is placed on hold and an interrupt tone to be used in the after-mentioned Internet call process (see FIG. 3) and ordinary call process (see FIG. 4) are recorded.

The PC 20 comprises a control unit 21 for controlling the operation of the entire PC 20, a storage unit 22 for storing a variety of information, a communication unit 23 for connecting the PC 20 to the Internet network 200, an external interface 24 including an audio signal interface (hereinafter referred to as the "audio I/F") 24a for inputting/outputting audio signals through the audio cable 300 and a control signal interface (hereinafter referred to as the "control I/F") 24b for inputting/outputting control signals through the USB cable 400, an operation unit 25 including a keyboard and a mouse, and a display 26.

The PC 20 has a function to perform a voice call based on audio signals transmitted through the Internet network 200 (hereinafter referred to as the "Internet call function"). The Internet call function is fulfilled by executing the below mentioned call enabling process, call transmission/reception process and call termination process according to the procedure indicated by application software (hereinafter referred to as the "call software") installed in the storage unit 22.

The call enabling process is a process to establish a connection (a connection of a logical communication path) between the PC 20 and a PC having the same call software installed among other PCs capable of performing data communication through the Internet network 200 and thereby to start data communication with the connected PC. The call enabling process is executed when an operation to specify a PC to be connected is performed by the operation unit 25 during the run state of the call software. A notification signal as a control signal for notifying an enabled voice call continues to be output by the call software to the multifunction machine 10 through the audio I/F 24a and the USB cable 400 from when the voice call by the Internet call function is enabled by executing the call enabling process until when the voice call by the Internet call function is terminated by executing the call termination process.

The transmission/reception process is a process to generate packet data and transmit the data to the connected PC through the communication unit 23 and the Internet network 200 as well as to generate audio signals based on the packet data transmitted from the connected PC through the Internet network 200 and the communication unit 23. In the present embodiment, the packet data is generated based on audio signals input from the multifunction machine 10 through the audio cable 300 and the audio I/F 24a, and then the data is output to the Internet network 200. Also, audio signals generated based on the packet data are output to the multifunction machine 10 through the audio I/F 24a and the audio cable 300.

The transmission/reception process is executed repeatedly from when the call enabling process is executed until when the call termination process is execute, and thereby a voice call is performed between the PC 20 (i.e. the multifunction machine connected to the PC 20) and the PC connected through the Internet network 200.

The call termination process is a process to terminate the use of the Internet call function by releasing the connection to the connected PC (disconnection of a logical communication path). The call termination process is executed when an operation to specify another PC as a call recipient or an operation to terminate the call software is performed by the operation unit 25. The call software is designed to transmit a release signal for notifying release of connection from the PC with the call software installed to the connected PC when an operation to terminate the call software itself is performed. The PC 20 also executes the call termination process when a release signal is received.

In a certain section (a section from the user to the telephone central office) of the communication path from the communication unit 23 of the PC 20 to the Internet network 200, the telephone line connecting from NCU 17 of the multifunction machine 10 to the telephone line network 100 is shared, although no detailed explanation about this is provided here. In this section, audio signals to be transmitted through the telephone line network 100 and data to be transmitted through the Internet network 200 are transmitted at the same time by ADSL (Asymmetric Digital Subscriber Line) technology.

[The Processing Procedure by the Control Unit 11 of the Multifunction Machine 10]

The processing procedure executed by the control unit 11 provided in the multifunction machine 10 from when the multifunction machine 10 is activated (the power: ON) until when it is stopped (the power: OFF) will now be described below with reference to FIG. 2.

The control unit 11 first determines whether or not a voice call is in progress (s110). Specifically, it is determined whether or not an ordinary audio call through the telephone line network 100 or a voice call by the Internet call function is being performed by checking whether audio signals are input from either the NCU 17 or the audio I/F 18a.

When it is determined that a voice call is not in progress (s110: NO), the control unit 11 next determines whether or not the operation keys 13a of the user I/F 13 or the operation keys 33 of the handset terminal 30 have been operated (s120). Since the handset terminal 30 is designed to transmit to the wireless communication unit 37 various commands indicating the nature of respective operations when the operation keys are operated, the control unit 11 which receives the commands can detect that the operation keys 33 of the handset terminal 30 have been operated and specify the nature of the operations based on the commands.

When it is determined that any operation by the operation keys 13a or 33 has not been performed (s120: NO), the procedure returns to the process of s110.

On the other hand, when it is determined that an operation by the operation keys 13a or 33 has been performed (s120: YES), and also if the nature of the operation is a calling operation (s130: YES), calling process is performed (s140). The "calling operation" here means an operation to specify a telephone number using the number keys constituting the operation keys 13a, 33 after an off-hook operation. The "calling process" means an operation to call the call recipient at the telephone number specified by the calling operation.

Then, the control unit 11 determines whether or not the call recipient has responded (s150). If it is determined that the call recipient has not responded (s150: NO) and that an on-hook operation has not been performed (s160: NO), the control unit 11 returns to the process of s150.

If it is determined that the call recipient has responded (s150: YES) or that an on-hook operation has been performed (s160: YES), the control unit 11 returns to the process of s110. When the call recipient has responded, it means that an ordinary audio call through the telephone line network 100 is in progress.

If it is determined that the nature of the operation is a switching operation (s130: NO), the control unit 11 makes the transmission path to be used for input/output of audio signals from/to the outside source switched from the NCU 17 to the audio I/F 18a (s170). The "switching operation" here means an operation to switch the transmission path to the audio I/F 18a and thereby to allow audio based on the audio signals input/output from/to the PC 20 through the audio cable 800 and the audio I/F 18a to be input/output through the transmitter/receiver or the like.

In this case, if the use of the Internet call function is started in the PC 20, an indirect audio call by the Internet call function may be made through the transmitter/receiver or the like provided in the multifunction machine 10.

Particular operation of the above "switching operation" is pressing the switch key constituting the operation keys 13a of the user I/F 13 or long pressing a number key "5", constituting the operation keys 33 of the handset terminal 80. Once the "switching operation" is performed, a control signal for switching the transmission path to the audio I/F 18a is output to the path switching unit 19, and then the path switching unit 19 switches the transmission path from the NCU 17 to the audio I/F 18a.

After the process of s170 is finished, the procedure returns to the process of s110.

Figure 3:
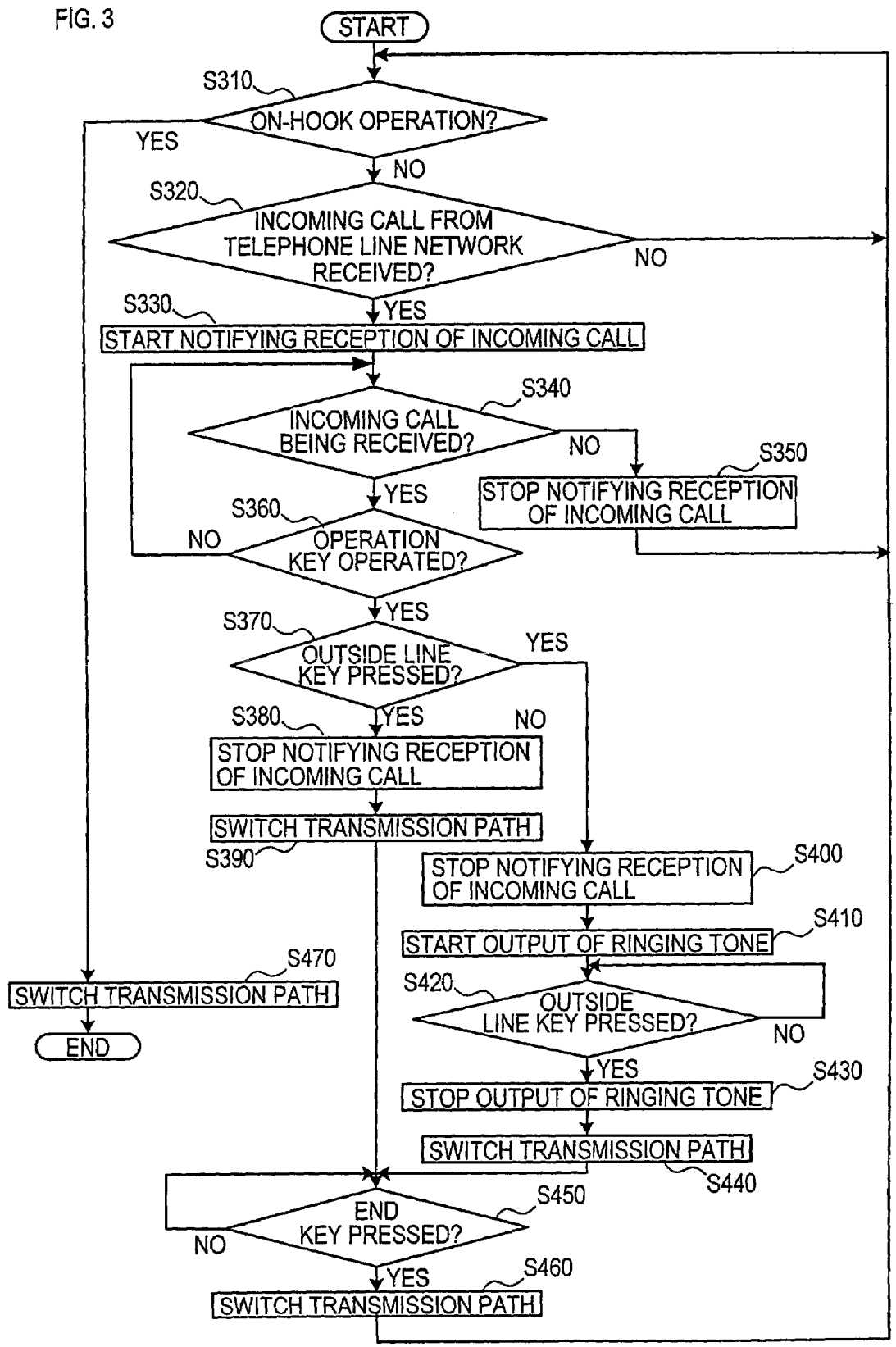
FIG. 3 is a flowchart showing the procedure of an Internet call process.

When it is determined that a voice call is in progress (s110: YES) and that the voice call is an indirect audio call by the Internet call function through the transmitter/receiver or the like (s180: YES), the control unit 11 performs the Internet call process (s190) The Internet call process is a process to switch from the state in which an indirect audio call by the Internet call function through the transmitter/receiver or the like is in progress to the state in which an ordinary audio call through the telephone line network 100 is performed, or to switch back to the state in which a voice call by the Internet call function is performed. The detailed procedure of the Internet call process will be provided below in [The Internet Call Process by the Control Unit 11 of the Multifunction Machine 10] (FIG. 3).

On the other hand, when it is determined that the voice call in progress is an ordinary audio call through the telephone line network 100 (s180: NO), the control unit 11 performs the ordinary call process (s200). The ordinary call process is a process to switch from the state in which an ordinary audio call through the telephone line network 100 is in progress to the state in which a voice call by the Internet call function is performed, or to switch back to the state in which an ordinary audio call is performed. The detailed procedure of the ordinary call process will be provided below in [The Ordinary Call Process by the Control Unit 11 of the Multifunction Machine 10] (FIG. 4).

Once the control unit 11 performs the process of s190 or s200, the procedure returns to the process of s110.

[The Internet Call Process by the Control Unit 11 of the Multifunction machine 10]

Figure 2:
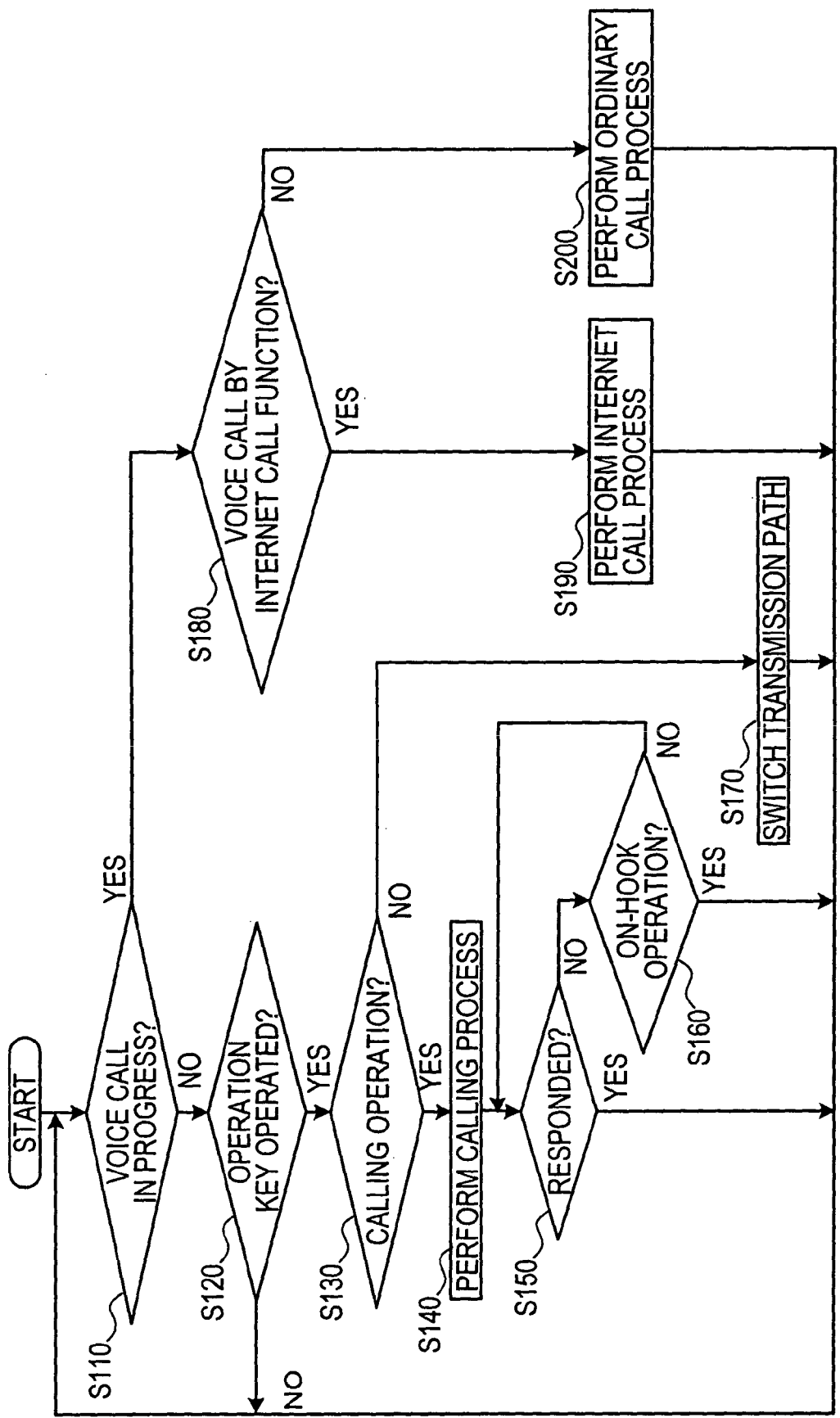
FIG. 2 is a flowchart showing a processing procedure executed by a multifunction machine.

The procedure of the Internet call process executed by the control unit 11 provided in the multifunction machine 10 will now be described with reference to FIG. 3. The procedure of the Internet call process, which is the details of the process of s190 shown in FIG. 2, is performed after the transmission path to be used for input/output of audio signals from/to the outside source is switched to the audio I/F 18a, i.e. after an indirect audio call by the Internet call function through the transmitter/receiver or the like becomes available.

The control unit 11 first determines whether or not an on-hook operation has been performed (s310).

When it is determined that an on-hook operation has not been performed (s310: NO), the control unit 11 then determines whether or not an incoming call from the telephone line network 100 has been received (s320).

If it is determined that an incoming call from the telephone line network 100 has not been received (s320: NO), the procedure returns to the process of s310.

If it is determined that an incoming call from the telephone line network 100 has been received (s320: YES), the control unit 11 starts notifying reception of an incoming call from the telephone line network 100 (s330).

Specifically, when the transmitter/receiver or the like used for a voice call by the Internet call function is the handset 14 or the audio input/output unit 15, a control signal to start reproducing an interrupt tone is provided to the recording/reproducing unit 12, and then the recording/reproducing unit 12 which has received the control signal starts reproducing the interrupt tone by the message reproducing unit 12a. Then, a control signal to set a transmission path of audio signals from the recording/reproducing unit 12 to the transmitter/receiver or the like (the transmitter/receiver or the like used for a voice call by the Internet call function) is provided to the transmission path switching unit 19, and then the transmission path switching unit 19 sets the transmission path of audio signals from the recording/reproducing unit 12 to the transmitter/receiver or the like.

When the transmitter/receiver or the like used for a voice call by the Internet call function is the handset terminal 30, a control signal to start reproducing an interrupt tone is transmitted to the handset terminal 30 through the wireless communication unit 16, and then the handset terminal 30 which has received the control signal starts reproducing an interrupt tone by the reproducing unit 35 as well as outputs the interrupt tone through the speaker 36.

Thus, an interrupt tone along with the audio from the other end of the call may be output from the transmitter/receiver or the like used for the voice call by the Internet call function. By outputting the interrupt tone from the transmitter/receiver or the like as above, the reception of an incoming call from the telephone line network 100 is notified.

Then, the control unit 11 determines whether or not the incoming call from the telephone line network 100 is being received (s340).

If it is determined that the incoming call from the telephone line network 100 is not being received (s340: NO), the control unit 11 stops notifying the reception of the incoming call from the telephone line network 100 (s350), and then the procedure returns to the process of s310.

In the process of s350, when the transmitter/receiver or the like used for the voice call by the Internet call function is the handset 14 or the audio input/output unit 15, a control signal to stop reproducing the interrupt tone is provided to the recording/reproducing unit 12, and then the recording/reproducing unit 12 which has received the control signal stops reproducing the interrupt tone by the message reproducing unit 12*a*. Then, a control signal to clear the setting of a transmission path as the transmission path of audio signals from the recording/reproducing unit 12 to transmitter/receiver or the like is provided to the transmission path switching unit 19, and then the transmission path switching unit 19 which has received the control signal clears the setting of the corresponding transmission path.

When the transmitter/receiver or the like used for the voice call by the Internet call function is the handset terminal 30, a control signal to stop reproducing the interrupt tone is transmitted to the handset terminal 80 through the wireless communication unit 16, and then the handset terminal 30 which has received the control signal stops reproducing the interrupt tone by the reproducing unit 35. By this, output of the interrupt tone from the transmitter/receiver or the like being used for the voice call by the Internet call function is stopped.

On the other hand, if it is determined that the incoming call from the telephone line network 100 is being received (s340: YES), the control unit 11 subsequently determines whether or not the operation keys 13*a* of the user I/F 13 or the operation keys 33 of the handset terminal 30 have been operated (s360).

When it is determined in s360 that the operation keys 13*a* or 33 have not been operated (s360: NO), the procedure returns to the process of s340.

When it is determined that the operation keys 13*a* or 33 have been operated (s360: YES), and if the specific operation is pressing the outside line key (s370: YES), the control unit 11 stops notifying the reception of the incoming call from the telephone line network 100 (s380), and then makes the transmission path to be used for inputting/outputting audio signals from/to the outside source switched back from the audio I/F 18*a* to the NCU 17 (s390). The process of s380 is the same as the process of s350.

In the process of s390, specifically, a control signal to switch the transmission path to the NCU 17 is provided to the path switching unit 19, and then the path switching unit 19 which has received the control signal switches back the transmission path from the audio I/F 18*a* to the NCU 17. Then, an ordinary audio call through the telephone line network 100 becomes available.

If the specific operation determined in s360 is pressing the end key of the operation keys 13*a* or 33 (s370: NO), the control unit 11 stops notifying the reception of the incoming call from the telephone line network 100 (s400). The process of s400 is the same as the process of s350 or s380.

Subsequently, the control unit 11 starts output of a ringing tone (s410). In this process, a control signal to start reproducing a ringing tone is provided to the recording/reproducing unit 12, and then the recording/reproducing unit 12 which has received the control signal starts reproducing the ringing tone by the message reproducing unit 12*a*.

Then, a control signal to set a transmission path of audio signals from the recording/reproducing unit 12 to the audio input/output unit 15 is provided to the transmission path switching unit 19, and then the transmission path switching unit 19 which has received the control signal sets the transmission path of audio signals from the recording/reproducing unit 12 to the audio input/output unit 15. Thus, output of the ringing tone through the speaker 15*a* of the audio input/output unit 15 is started.

In the process of s410, the control signal to start reproducing a ringing tone is provided also to the handset terminal 30 through the wireless communication unit 16, and the handset terminal 30 which has received the control signal starts reproducing a ringing tone by the reproducing unit 35 as well as outputs the ringing tone through the speaker unit 36.

Subsequently, the control unit 11 waits until the outside line key of the operation keys 13*a* or 33 is pressed (s420: NO). When it is determined that the outside line key has been pressed (s420: YES), the control unit 11 terminates output of the ringing tone (s430). In this process, a control signal to terminate reproduction of the ringing tone is provided to the recording/reproducing unit 12, and then the recording/reproducing unit 12 which has received the control signal terminates reproduction of the ringing tone by the message reproducing unit 12*a*.

Then, a control signal to clear the setting of a transmission path as the transmission path of audio signals from the recording/reproducing unit 12 to the audio input/output unit 15 is provided to the transmission path switching unit 19, and then the transmission path switching unit 19 which has received the control signal clears the setting of the transmission path from the recording/reproducing unit 12 to the audio input/output unit 15. By this, output of the ringing tone through the speaker 15*a* of the audio input/output unit 15 is terminated.

In the process of s420, the control signal to terminate reproduction of the ringing tone is provided also to the handset terminal 30 through the wireless communication unit 16, and the handset terminal 30 which has received the control signal terminates reproduction of the ringing tone by the reproducing unit 35.

Subsequently, the control unit 11 makes the transmission path to be used for inputting/outputting audio signals from/to the outside source switched back from the audio I/F 18*a* to the NCU 17 (s440). By this process, an ordinary audio call through the telephone line network 100 becomes available in the same manner as by the process of s390.

After performing the process of s390 or s440, the control unit 11 waits until the end key constituting the operation keys 13a or 33 is pressed (s450: NO). Until when the end key is pressed, an ordinary audio call through the telephone line network 100 is in progress.

When it is determined that the end key constituting the operation keys 13a or 33 has been pressed (s450: YES), the control unit 11 makes the transmission path to be used for inputting/outputting audio signals from/to the outside source switched from the NCU 17 to the audio I/F 18a (s460). In this process, a control signal to switch the transmission path from the NCU 17 to the audio I/F 18a is provided to the path switching unit 19, and then the path switching unit 19 which has received the control signal switches the transmission path from the NCU 17 to the audio I/F 18a. Then, a voice call by the Internet call function becomes available again.

When it is determined in s310 that an on-hook operation has been performed (s310: YES) after repeated performance of the processes of s310 to s460 the control unit 11 makes the transmission path to be used for inputting/outputting audio signals from/to the outside source switched from the audio I/F 18a to the NCU 17 (s470), and then terminates the present Internet call process. The process of s470 is the same as the process of s350, 380 or 440.

[The Ordinary Call Process by the Control Unit 11 of the Multifunction Machine 10]

The procedure of the ordinary call process executed by the control unit 11 provided in the multifunction machine 10 will now be described with reference to FIG. 4. The procedure of the ordinary call process, which is the details of the process of s200 shown in FIG. 2, is performed after the transmission path to be used for input/output of audio signals from/to the outside source is switched to the NCU 17, i.e. after an ordinary audio call through the telephone line network 100 becomes available.

The control unit 11 first determines whether or not an on-hook operation has been performed (s510).

When it is determined that an on-hook operation has not been performed (s510: NO), the control unit 11 determines whether or not a voice call by the Internet call function has been enabled at the PC 20 (s520). Specifically, it is determined whether or not a voice call by the Internet call function has been enabled by checking whether a notification signal (a control signal for notifying that a voice call by the Internet call function has been enabled at the PC 20) has been input through the USB cable 400 and the control I/F 18b.

If it is determined that a voice call by the Internet call function has not been enabled (s520: NO), the procedure returns to the process of s510.

If it is determined that a voice call by the Internet call function has been enabled (s520: YES), the control unit 11 starts notifying the enabled voice call by the Internet call function (s530).

Specifically, when the transmitter/receiver or the like used for the ordinary audio call through the telephone line network 100 is the handset 14 or the audio input/output unit 15, the recording/reproducing unit 12 starts reproducing an interrupt tone by the message reproducing unit 12a, and the transmission path switching unit 19 sets the transmission path of audio signals from the recording/reproducing unit 12 to the transmitter/receiver or the like (the transmitter/receiver or the like used for the ordinary audio call through the telephone line network 100) in the same manner as in the process of s330 in FIG. 3.

When the transmitter/receiver or the like used for the ordinary audio call through the telephone line network 100 is the handset terminal 30, the handset terminal 30 starts reproducing an interrupt tone by the reproducing unit 35 as well as outputs the interrupt tone through the speaker 36.

Thus, an interrupt tone along with audio from the other end of the call can be output from the transmitter/receiver or the like used for the ordinary audio call through the telephone line network 100. By outputting the interrupt tone from the transmitter/receiver or the like as above, the enabled voice call by the Internet call function is notified.

Then, the control unit 11 determines whether or not the voice call by the Internet call function is being continued (s540). Specifically, it is determined that the voice call by the Internet call function is being continued if the notification signal is being input through the USB cable 400 and the control I/F 18b, while it is determined that the voice call by the Internet call function is not being continued if the notification signal is not being input.

If it is determined in S540 that the voice call by the Internet call function is not being continued (s540: NO), the control unit 11 stops notifying the enabled voice call by the Internet call function (s550), and then the procedure returns to the process of s510.

In the process of s550, when the transmitter/receiver or the like used for the ordinary audio call through the telephone line network 100 is the handset 14 or the audio input/output unit 15, the recording/reproducing unit 12 stops reproducing the interrupt tone by the message reproducing unit 12a, and the transmission path switching unit 19 clears the setting of the transmission path of audio signals from the recording/reproducing unit 12 to the transmitter/receiver or the like in the same manner as in the process of s350 in FIG. 3.

When the transmitter/receiver or the like used for the ordinary audio call through the telephone line network 100 is the handset terminal 30, the handset terminal 30 stops reproducing the interrupt tone by the reproducing unit 35. By this, output of the interrupt tone from the transmitter/receiver or the like used for the ordinary audio call through the telephone line network 100 is stopped.

On the other hand, if it is determined in s540 that the voice call by the Internet call function is being continued (s540: YES), the control unit 11 subsequently determines whether or not the operation keys 13a of the user I/F 13 or the operation keys 33 of the handset terminal 30 have been operated (s560).

When it is determined that the operation keys 13a or 33 have not been operated (s560: NO), the procedure returns to the process of s540.

When it is determined that the operation keys 13a or 33 have been operated (s560: YES), and if the specific operation is pressing the outside line key constituting the operation keys 13a or 33 (s570. YES), the control unit 11 stops notifying the enabled voice call by the Internet call function (s580), and then makes the transmission path to be used for inputting/outputting audio signals from/to the outside source switched from the NCU 17 to the audio I/F 18a (s590). The process of s580 is the same as the process of s550.

In the process of s590, specifically, a control signal to switch the transmission path to the audio I/F 18a is provided to the path switching unit 19, and then the path switching unit 19 which has received the control signal switches the transmission path from the NCU 17 to the audio I/F 18a. Then, a voice call by the Internet call function becomes available.

If the specific operation is pressing the end key of the operation keys 13a or 33 (s570: NO), the control unit 11 stops notifying the enabled voice call by the Internet call function (s600). The process of s600 is the same as the process of s550 or s580.

Subsequently, the control unit 11 starts output of a ringing tone (s610). In this process, the recording/reproducing unit 12 starts reproducing the ringing tone by the message reproducing unit 12a, and the transmission path switching unit 19 sets the transmission path of audio signals from the recording/reproducing unit 12 to the audio input/output unit 15. Thus, output of the ringing tone from the speaker 15a of the audio input/output unit 15 is started. Also, the handset terminal 30 starts reproducing a ringing tone by the reproducing unit 35 as well as outputs the ringing tone through the speaker unit 36.

Subsequently, the control unit 11 waits until the outside line key of the operation keys 13a or 33 is pressed (s620: NO). When it is determined that the outside line key has been pressed (s620: YES), output of the ringing tone is terminated (s630). In this process, the recording/reproducing unit 12 terminates reproduction of the ringing tone by the message reproducing unit 12a, and the transmission path switching unit 19 clears the setting of the transmission path from the recording/reproducing unit 12 to the audio input/output unit 15. By this, output of the ringing tone through the speaker 15a of the audio input/output unit 15 is terminated. Also, the handset terminal 30 terminates reproduction of the ringing tone by the reproducing unit 35.

Subsequently, the control unit 11 makes the transmission path to be used for inputting/outputting audio signals from/to the outside source switched from the NCU 17 to the audio I/F 18a (s640). By this process, a voice call by the Internet call function becomes available in the same manner as by the process of s590.

After performing the process of s590 or s640, the control unit 11 waits until the end key constituting the operation keys 13a or 33 is pressed (s650: NO). Until when the end key is pressed, a voice call by the Internet call function may be in progress.

When it is determined that the end key constituting the operation keys 13a or 33 has been pressed (s650: YES), the control unit 11 makes the transmission path to be used for inputting/outputting audio signals from/to the outside source switched from the audio I/F 18a to the NCU 17 (s660). In this process, the path switching unit 19 switches the transmission path from the audio I/F 18a to the NCU 17. Then, an ordinary audio call through the telephone line network 100 becomes available again.

When it is determined in s510 that an on-hook operation has been performed (s510: YES) after repeated performance of the processes of s510 to s660, the present ordinary audio call process is terminated.

[Advantages]

According to the call system 1 configured as above, it is possible to switch in the process of s170 the output destination of audio signals based on audio input from the transmitter/receiver or the like and the input source of audio signals to be output as audio from the transmitter/receiver or the like to the audio I/F 18a capable of inputting audio signals from the outside source and of outputting audio signals to the outside source.

In the state in which the input source and the output destination of audio signals have been switched to the audio I/F 18a, audio based on the audio signals input from the outside source through the audio I/F 18a is output from the transmitter/receiver or the like, and audio signals based on audio input from the transmitter/receiver or the like is output to the outside source through the audio I/F 18a.

Accordingly, in the present call system 1 in which the multifunction machine 10 is connected to the PC 20 having the Internet call function such that input/output of audio signals is allowed through the audio cable 300 between the multifunction machine 10 and the PC 20, an indirect audio call can be made by the Internet call function with the transmitter/receiver or the like of the multifunction machine 10.

Also, if an incoming call from the telephone line network 100 is received in the state in which the input source and the output destination of audio signals have been switched to the audio I/F 18a, notification of the reception of the incoming call from the telephone line network 100 is made in the process of s330 in FIG. 8. "The state in which the input source and the output destination of audio signals have been switched to the audio I/F 18a" here means that an indirect audio call by the Internet call function is available with the transmitter/receiver or the like. Therefore, when a user receives an incoming call from the telephone line network 100 while a voice call by the Internet call function is in progress, the user can confirm reception of the incoming call from the telephone line network 100 by the notification in the process of s330.

The user who has confirmed reception of the incoming call may respond to the incoming call from the telephone line network 100 by making the input source and the output destination of audio signals switched to the telephone line network 100 in the process of s390 or s440 in FIG. 3. Furthermore, the user may return to the voice call by the Internet call function on hold by making the input source and the output destination of audio signals switched back to the audio I/F 18a in the process of s460 in FIG. 3.

As described above, the present call system 1 accomplishes the same function as an interrupt call service (so-called Catch Phone™ service) offered by the telephone central office in connection with ordinary audio calls through the telephone line network 100 by the function provided for the multifunction machine 10 itself.

Since an interrupt tone to notify the reception of the incoming call is output from the transmitter/receiver or the like in the process of s330, the user who is performing the indirect audio call by the Internet call function easily finds the notification by the process of s330 and is prevented from failing to respond to the incoming call from the telephone line network 100.

When the voice call by the Internet call function is enabled, the PC 20 provides a notification signal as a control signal for notifying the enabled voice call to the multifunction machine 10 through the control I/F 24b and the USB cable 400, according to the procedure indicated by the call software The multifunction machine 10 which receives the notification signal through the USB cable 400 and the control I/F 18b notifies the enabled voice call by the Internet call function in the process of s530 in FIG. 4, if the output destination of audio signals based on audio input from the transmitter/receiver or the like and the input source of audio signals to be output as audio from the transmitter/receiver or the like have been switched to the telephone line network 100.

"The state in which the output destination and the input source of audio signals have been switched to the telephone line network 100" here means that an ordinary audio call through the telephone line network 100 is in progress. Therefore, when a voice call by the Internet call function is enabled while an ordinary audio call through the telephone line network 100a is in progress, the user can confirm the enabled voice call by the Internet call function by the notification in the process of s530.

The user who has confirmed the enabled voice call by the Internet call function may respond to the voice call by the Internet call function by making the output destination and the input source of audio signals switched to the audio I/F 18a in the process of s590 or s640 in FIG. 4. Furthermore, the user may return to the ordinary audio call through the telephone line network 100 on hold by making the output destination and the input source of audio signals switched back to the NCU 17 in the process of s660 in FIG. 4.

As described above, the present call system 1 accomplishes the same function as an interrupt call service offered by the telephone central office in connection with ordinary audio calls through the telephone line network 100 by the functions provided for the PC 20 and the multifunction machine 10.

Since an interrupt tone to notify the enabled voice call by the Internet call function is output from the transmitter/receiver or the like in the process of s530 in FIG. 4, the user who is performing the ordinary audio call easily finds the notification by the process of s530 and is prevented from failing to respond to the voice call by the Internet call function.

[Modifications]

Although the present invention has been described in connection with the above embodiment, the present invention is not limited to the embodiment but may have a various forms.

While the configuration of the telephone terminal of the present invention is applied to the multifunction machine 10 in the above embodiment, the configuration of the telephone terminal of the present invention may be applied to any apparatus other than the multifunction machine 10 as long as the apparatus has the function as a telephone terminal.

While the multifunction machine 10 and the PC 20 are connected through the USB cable 400 in the above embodiment, any cable capable of transmitting control signals may be employed. For example, the multifunction machine 10 and the PC 20 may be connected through a serial transmission cable such as RS/232C (Recommended Standard 282C) and IEEE1394 (Institute of Electrical and Electronic Engineers 1394), or a parallel transmission cable such as SCSI (Small Computer System Interface) and GPIB (General Purpose Interface Bus).

In the above described embodiment, the processes shown in FIG. 2, FIG. 3 and FIG. 4 are executed by a computer system comprising the control unit 11 of the multifunction machine 10. However, one or more of these processes may be executed by another computer system connected to the multifunction machine 10 through a cable or wireless signal transmission path.

In the above described embodiment, when it is determined in s120 that any operation by the operation keys 13a or 33 has not been performed, the procedure returns to the process of s110. However, it may be possible to determine whether or not an incoming call from the telephone line network 100 has been received and then perform a process to respond to the incoming call when it is determined in s120 that any operation has not been performed.

In the above described embodiment, it is determined in s120 whether any operation by the operation keys 13a or 33 has been performed, and processes corresponding to either the calling operation or the switching operation are performed subsequently to the process of s130. However, processes corresponding to an operation other than the calling operation and the switching operation may be performed subsequently to the process of s130.

In the above described embodiment, it is determined in s360 in FIG. 3 and s560 in FIG. 4 whether any operation by the operation keys 13a or 33 has been performed, and processes corresponding to either the operation of pressing the outside line key or the operation of pressing the end key are performed subsequently to the process of s370 and s570. However, processes corresponding to an operation other than the operation of pressing the outside line key and the operation of pressing the end key may be performed subsequently to the process of s370 and s570.

Also, in the above described embodiment, a notification signal continues to be output by the call software through the audio I/F 24a and the USB cable 400 from when the voice call by the Internet call function is enabled until when the voice call is terminated. However, the call software may be configured such that an enabling notification signal for noticing an enabled voice call is output to the multifunction machine 10 when a call enabling process is executed while a termination notification signal for notifying the termination of the voice call is output to the multifunction machine 10 when a call termination process is executed.

In this case, the control unit 11 of the multifunction machine 10 may determine whether or not the voice call by the Internet call function is being continued by checking whether the termination notification signal has been input in the process of s540. Then, it is not necessary to continue to output a notification signal from the PC 20 side.

In the above described embodiment, reception of an incoming call is notified by outputting an interrupt tone from the transmitter/receiver or the like in the process of s330 in FIG. 8. However, reception of an incoming call may be notified by displaying a message indicating reception of the incoming call on the display panel 13b of the user I/F 13 or the display panel 34 of the handset terminal 30, or by actuating a mechanism that performs a specific action, such as a vibrator including a motor.

Further, in the above described embodiment, a specific operation of pressing the switch key constituting the operation keys 13a of the user I/F 18 or of long pressing the key "5" constituting the operation keys 33 of the handset terminal 30 (i.e. switching operation) is presented as a "user's operation" that causes the output destination and the input source of audio signals to be switched to the audio I/F 18a in the process of s170 in FIG. 2. However, the "user's operation" may be, for example, operating some of the operation keys 13a in a specific order.

What is claimed is:

1. A single telephone terminal for enabling a voice call by inputting/outputting audio based on audio signals transmitted through a telephone line network from a transmitter/receiver, the single telephone terminal comprising:

a Network Control Unit (NCU) capable of inputting/outputting audio signals through the telephone line network;

an audio input/output path provided beside the NCU and capable of inputting/outputting audio signals from/to an outside source through an Internet network;

a switch device for switching an output destination of audio signals based on audio input from the transmitter/receiver and an input source of audio signals to be outputted as audio from the transmitter/receiver from the NCU to the audio input/output path according to a user's operation; and a telephone call notification device for notifying through the single telephone terminal of reception of an incoming call from the telephone line network when the incoming call from the telephone line network is received in the state in which the output destination and the input source of audio signals have been switched to the audio input/output path by the switch device, wherein the switch device switches the output destination of audio signals based on audio input from the transmitter/receiver and the input source of audio signals to be outputted as audio from the transmitter/receiver from the NCU to the audio input/output path in response to detecting that a call via the NCU is ended after notification by the telephone call notification device.

2. The single telephone terminal as set forth in claim 1, wherein the telephone call notification device makes audio output from the transmitter/receiver indicating that an incoming call has been received from the telephone line network.

3. A call system comprising:
an Internet terminal with an Internet call function allowing input/output of audio signals transmitted through an Internet network; and
a terminal device connected to the Internet terminal through an audio transmission path for transmitting audio signals,
wherein the Internet terminal makes the terminal device output audio based on audio signals to thereby perform a voice call,
wherein the terminal device is a single telephone terminal including:
a Network Control Unit (NCU) capable of inputting/outputting audio signals through the telephone line network;
an audio input/output path provided besides the NCU and capable of inputting/outputting audio signals from/to an outside source through an Internet network;
a switch device for switching an output destination of audio signals based on audio input from the transmitter/receiver and an input source of audio signals to be outputted as audio from the transmitter/receiver from the NCU to the audio input/output path according to a user's operation; and
a telephone call notification device for notifying through the single telephone terminal of reception of an incoming call from the telephone line network when the incoming call from the telephone line network is received in the state in which the output destination and the input source of audio signals have been switched to the audio input/output path by the switch device, and
wherein the switch device switches the output destination of audio signals based on audio input from the transmitter/receiver and the input source of audio signals to be outputted as audio from the transmitter/receiver from the NCU to the audio input/output path in response to detecting that a call via the NCU is ended after notification by the telephone call notification device.

4. A call system comprising:
an Internet terminal with an Internet call function allowing input/output of audio signals transmitted through an Internet network; and
a single telephone terminal for performing a voice call by inputting/outputting audio based on audio signals transmitted through a telephone line network from a transmitter/receiver, the single telephone terminal being connected to the Internet terminal through an audio transmission path for transmitting audio signals and a control transmission path for transmitting control signals,
wherein the Internet terminal includes:
an Internet terminal side audio input/output path for inputting/outputting audio signals from/to the single telephone terminal through the audio transmission path,
an Internet terminal side control output path for outputting control signals to the single telephone terminal through the control transmission path, and
a notification signal output device for outputting a notification signal as a control signal for notifying an enabled voice call by the Internet call function to the single telephone terminal through the Internet terminal side control output path and the control transmission path when the voice call is enabled,
wherein the single telephone terminal includes:
a telephone terminal side audio input/output path for inputting/outputting audio signals from/to the Internet terminal through the audio transmission path,
a telephone terminal side control input path for inputting control signals from the Internet terminal through the control transmission path,
a switch device for switching an output destination of audio signals based on audio input from the transmitter/receiver and an input source of audio signals to be outputted as audio from the transmitter/receiver between a Network Control Unit (NCU) of the telephone terminal and the telephone terminal side audio input/output path according to a user's operation, and
an Internet call notification device for notifying through the single telephone terminal of an enabled voice call by the Internet call function when the notification signal is inputted from the Internet terminal through the control transmission path and the telephone terminal side control input path in the state in which the output destination and the input source of audio signals have been switched to the NCU of the single telephone terminal by the switch device, and
wherein the switch device switches the output destination of audio signals based on audio input from the transmitter/receiver and the input source of audio signals to be outputted as audio from the transmitter/receiver from the audio input/output path to the NCU in response to detecting that a call via the audio input/output path is ended after notification by the internet call notification device.

5. The call system as set forth in claim 4, wherein the Internet call notification device included in the single telephone terminal makes audio output from the transmitter/receiver indicating the enabled voice call by the Internet call function.

6. A tangible control unit containing a terminal control computer program to make a computer system execute a variety of processes for controlling a single telephone terminal that performs a voice call by inputting/outputting audio based on audio signals transmitted through a telephone line network, the terminal control program including:
a switching process to switch an output destination of audio signals based on audio input from a transmitter/receiver and an input source of audio signals to be outputted as audio from the transmitter/receiver from a Network Control Unit (NCU) of the single telephone terminal to an audio input/output path for inputting/outputting audio signals from/to an outside source; and
a telephone call notification process to notify through the single telephone terminal of reception of an incoming call from the telephone line network when the incoming call from the telephone line network is received in the state in which the output destination and the input source of audio signals have been switched to the audio input/output path in the switching process,
wherein the switching process includes switching the output destination of audio signals based on audio input from the transmitter/receiver and the input source of audio signals to be outputted as audio from the transmitter/receiver from the NCU to the audio input/output path in response to detecting that a call via the NCU is ended after notification in the telephone call notification process.

7. A tangible control unit containing a terminal control computer program to make a computer system execute a variety of processes for controlling a single telephone terminal that performs a voice call by inputting/outputting audio based on audio signal transmitted through a telephone line network, the terminal control program including:

- a switching process to switch an output destination of audio signals based on audio input from a transmitter/receiver and an input source of audio signals to be outputted as audio from the transmitter/receiver between either a Network Control Unit (NCU) of the single telephone terminal or an audio input/output path capable of inputting/outputting audio signals from/to an outside source; and
- an Internet call notification process to notify through the single telephone terminal of the nature of a control signal when the control signal is inputted from the outside source through a control input path for inputting a control signal in the state in which the output destination and the input source of audio signals have been switched to the telephone line network in the switching process, wherein the switching process includes switching the output destination of audio signals based on audio input from the transmitter/receiver and the input source of audio signals to be outputted as audio from the transmitter/receiver from the audio input/output path to the NCU in response to detecting that a call via the audio input/output path is ended after notification in the internet call notification process.

* * * * *